United States Patent
Murray (10) Patent No.: US 8,955,506 B2
(45) Date of Patent: Feb. 17, 2015

(54) COMBUSTION CONVECTION OVEN WITH VARIABLE EXHAUST DAMPER

(71) Applicant: Robert Van Murray, Fuquay-Varina, NC (US)

(72) Inventor: Robert Van Murray, Fuquay-Varina, NC (US)

(73) Assignee: Middleby Marshall, Inc., Elgin, IL (US)

( * ) Notice: Subject to any disclaimer, the term of this patent is extended or adjusted under 35 U.S.C. 154(b) by 354 days.

(21) Appl. No.: 13/678,918

(22) Filed: Nov. 16, 2012

(65) Prior Publication Data

US 2014/0137853 A1    May 22, 2014

(51) Int. Cl.
*F24C 3/02*         (2006.01)
*F24C 15/32*        (2006.01)

(52) U.S. Cl.
CPC ............... *F24C 15/322* (2013.01); *F24C 3/022* (2013.01); *Y02B 40/166* (2013.01)
USPC ...................................... 126/21 A; 126/21 R (58) Field of Classification Search
USPC ............................... 126/21 A, 21 R; 219/400
See application file for complete search history.

(56) References Cited

U.S. PATENT DOCUMENTS

| | | |
|---|---|---|
| 4,308,444 A | 12/1981 | Takagi et al. |
| 4,369,347 A | 1/1983 | Shin |
| 4,510,854 A | 4/1985 | Robertson |
| 4,516,012 A * | 5/1985 | Smith et al. .................... 219/400 |
| 4,591,336 A | 5/1986 | Konczalski |
| 4,608,474 A | 8/1986 | Kohka |
| 4,831,225 A | 5/1989 | Ishifuro et al. |
| 4,831,238 A | 5/1989 | Smith et al. |
| 5,263,265 A | 11/1993 | Melgaard |
| 5,361,749 A | 11/1994 | Smith et al. |
| 5,460,157 A | 10/1995 | Prabhu |
| 5,609,095 A | 3/1997 | Lemke et al. |
| 5,655,511 A | 8/1997 | Prabhu |
| 6,041,771 A | 3/2000 | Hayes |
| 6,338,623 B1 | 1/2002 | Durrant |
| 6,433,323 B2 | 8/2002 | Kim |
| 6,604,931 B2 | 8/2003 | Durrant |
| 7,488,919 B2 | 2/2009 | Gagas et al. |
| 7,594,506 B2 | 9/2009 | Lundberg |
| 7,913,417 B2 | 3/2011 | Patka, Sr. et al. |
| 2003/0000513 A1 * | 1/2003 | Cole et al. .................... 126/21 A |

FOREIGN PATENT DOCUMENTS

CN          100541030 C      9/2009
WO          2011088230 A1    7/2011

* cited by examiner

*Primary Examiner* — Alfred Basichas
(74) *Attorney, Agent, or Firm* — Coats & Bennett, PLLC (57) ABSTRACT

A combustion convection oven has improved energy efficiency. The oven includes a moveable exhaust damper that selectively closes off the exhaust plenum so as to inhibit the escape of heated air from the oven's cooking cavity. The exhaust damper is open when the oven is in a heating mode with the burners on, but closed when the oven is in a heated mode where the burners are off. Thus, airflow through the oven is significantly reduced or eliminated when the burners are off. That damper, or another damper, may have a degree of openness that is controlled to be inverse to the speed of the oven's fan.

15 Claims, 6 Drawing Sheets

COMBUSTION CONVECTION OVEN WITH VARIABLE EXHAUST DAMPER

BACKGROUND

This application is directed to an approach for improved energy efficiency in combustion heated convection ovens.

Commercial combustion convection ovens utilize combustion of a gas to supply the heat to the cooking cavity to heat the food therein. As such, these ovens are sometimes referred to as "gas-fired" convection ovens. Such ovens also employ fans to forcibly circulate the air in the cooking cavity so as to improve thermal transfer to the food. Some designs of commercial combustion convection ovens are shown in U.S. Pat. No. 5,655,511 to Prabhu, and/or sold under the TRUVECTION and MARATHONER GOLD names by the Southbend division of Middleby Marshall, Inc. of Elgin, Ill.

While such ovens have been commercially successful, such designs may not be entirely energy efficient. For example, such ovens allow for the flow of air through the oven, from the air intake upstream of the burners, through the combustion chamber and cooking cavity, and out the exhaust, both while the burners are on and while the burners are off. The flow through the oven is advantageous while the burners are on, so that sufficient fresh air is supplied to the burners so that they may safely operate. However, while the burners are off, airflow through the oven, and particularly the cooking cavity, has the undesirable effect of removing heat unnecessarily from the cooking cavity, in the form of the heated exhaust air. In addition, such ovens may have multi-speed fans, but be designed to ensure sufficient airflow under worst case conditions, which may result in unnecessarily large amounts of airflow through the oven under better conditions. Once again, this may result in unnecessarily large amounts of heat being extracted from the cooking cavity, with a resulting loss in efficiency. As such, there remains a need for alternative approaches to combustion cooking ovens.

SUMMARY

The present invention relates to a combustion convection oven that has improved energy efficiency. The oven includes a moveable exhaust damper that selectively closes off the exhaust plenum so as to inhibit the escape of heated air from the oven's cooking cavity. The exhaust damper is open when the oven is in a heating mode with the burners on, but closed when the oven is in a heated mode where the burners are off. Thus, airflow through the oven is significantly reduced or eliminated when the burners are off. In some embodiments, the damper, or another damper, has a degree of openness that is controlled to be inverse to the speed of the oven's fan.

In one embodiment, the invention provides a method of reducing energy consumption when operating a combustion heated convection oven. The method includes operating the oven in a heating mode and thereafter operating the oven in a heated mode. In the heating mode a) one or more burners of the oven, disposed in a combustion chamber, are on; b) heated air from the combustion chamber is supplied to a cooking cavity; c) a fan forcibly circulates air in the cooking cavity; and d) an exhaust plenum is operatively open such that air may flow through the combustion chamber, through the cooking cavity, and through the exhaust plenum to outside the oven. In the a heated mode: a) the one or more burners are off; b) the fan forcibly circulates air in the cooking cavity; and c) the exhaust plenum is substantially operatively closed so that air does not flow out of the cooking cavity, through the exhaust plenum, and then out the oven. In some embodiments, the method continues by thereafter returning to the heating mode.

In some embodiments, the oven may also have an ignition mode, and the oven may automatically operate in the ignition mode prior to reentering the heating mode. In the ignition mode: a) the one or more burners are transitioned from being off to being on; b) the fan forcibly circulates air in the cooking cavity; and c) the exhaust plenum is substantially operatively closed so that air does not flow out of the cooking cavity, through the exhaust plenum, and then out the oven. The ignition mode is limited to last a predetermined time of not more than fifteen seconds (advantageously nor more than about eight to ten seconds, and more advantageously not more than about three to five seconds) and the oven transitions directly from the ignition mode to the heating mode. The oven automatically transitions from the heated mode to the heating mode only through the ignition mode. The ignition mode may include initiating heating of an igniter associated with the burner before supplying gas to the burners.

In some embodiments, the oven includes a damper associated with the exhaust plenum and operative to selectively move between a first position and a second position; the first position allowing airflow through the exhaust plenum; the second position substantially preventing airflow through the exhaust plenum. The oven may automatically move the damper to the first position when the oven is transitioning into the heating mode, and automatically move the damper to the second position when the oven is transitioning into the heated mode. The damper may be a first damper, with the oven advantageously further including a second damper distinct from the first damper and operatively disposed between the combustion chamber and the fan. The second damper may be operative to selectively move between a more open position and a more closed, but still open, position. The oven may automatically position the second damper, when in the heating mode, in the more open or more closed position depending on a speed of the fan such that the second damper is positioned in the more closed position when the speed is greater and in the more open position when the speed is lower. In some embodiments, the exhaust plenum includes an inlet port opening into the cooking cavity and an exit port selectively closable by the first damper. The oven may automatically move the first damper to the second position such that the first damper substantially seals the exit port.

In some embodiments, the oven includes a damper associated with the exhaust plenum and operative to selectively move between: a) a first position allowing airflow through the exhaust plenum; b) a second position allowing airflow through the exhaust plenum; and c) a third position substantially preventing airflow through the exhaust plenum, wherein the first position constricts the exhaust plenum more than the second position. The method may include automatically positioning the exhaust damper, when in the heating mode, in the first or second position depending on a speed of the fan such that the exhaust damper is positioned in the first position when the speed is greater and in the second position when the speed is lower.

In one embodiment, the present invention provides a combustion convection oven including a housing having an air intake, a combustion chamber disposed downstream of the air intake and having a plurality of burners, a cooking cavity disposed downstream of the combustion chamber, a fan operable to forcibly circulate air in the cooking cavity, and an exhaust plenum disposed downstream of the cooking cavity and leading from the cooking cavity to outside the housing. The oven further includes a first variable damper associated with the exhaust plenum and operative to automatically move between an open first position and a closed second position; the first position allowing airflow through the exhaust plenum; the second position substantially preventing airflow through the exhaust plenum. The oven is operative in a heated mode and a heating mode. In the heated mode, the burners are off, the fan circulates air in the cooking cavity, and the first damper is in the second position. In the heating mode, the burners are on, the fan circulates air in the cooking cavity, and the first damper is in the first position.

In some embodiments, the oven may advantageously also be operative in an ignition mode where the burners are transitioned from being off to being on and the first damper is in the second position. The oven may be operative to transition from the heated mode to the heating mode through the ignition mode.

The oven may have one or more of the following aspects. The first damper may be disposed closer to an downstream portion of the exhaust plenum than an upstream portion of the exhaust plenum, such as disposed at an exhaust port of the exhaust plenum. The oven may further include a controller disposed in the housing, and an actuator operative to move the first damper between the first and second positions, wherein the controller is operative to control the operation of the fan, the burners, and the actuator. The oven may include a variable second damper, distinct from the first damper, and operative to automatically variably restrict airflow through the oven inversely with a speed of the fan. The first damper may be further operative to automatically variably restrict airflow through the oven inversely with a speed of the fan.

The various aspects of the various embodiments may be used alone or in any combination, as is desired.

DETAILED DESCRIPTION

The present invention relates to a combustion convection oven that has improved energy efficiency. The oven includes a moveable exhaust damper that selectively closes off the exhaust plenum so as to inhibit the escape of heated air from the oven's cooking cavity. The exhaust damper is open when the oven is in a heating mode with the burners on, but closed when the oven is in a heated mode where the burners are off. Thus, airflow through the oven is significantly reduced or eliminated when the burners are off. In some embodiments, the damper, or another damper, has a degree of openness that is controlled to be inverse to the speed of the oven's fan.

Figure 1:
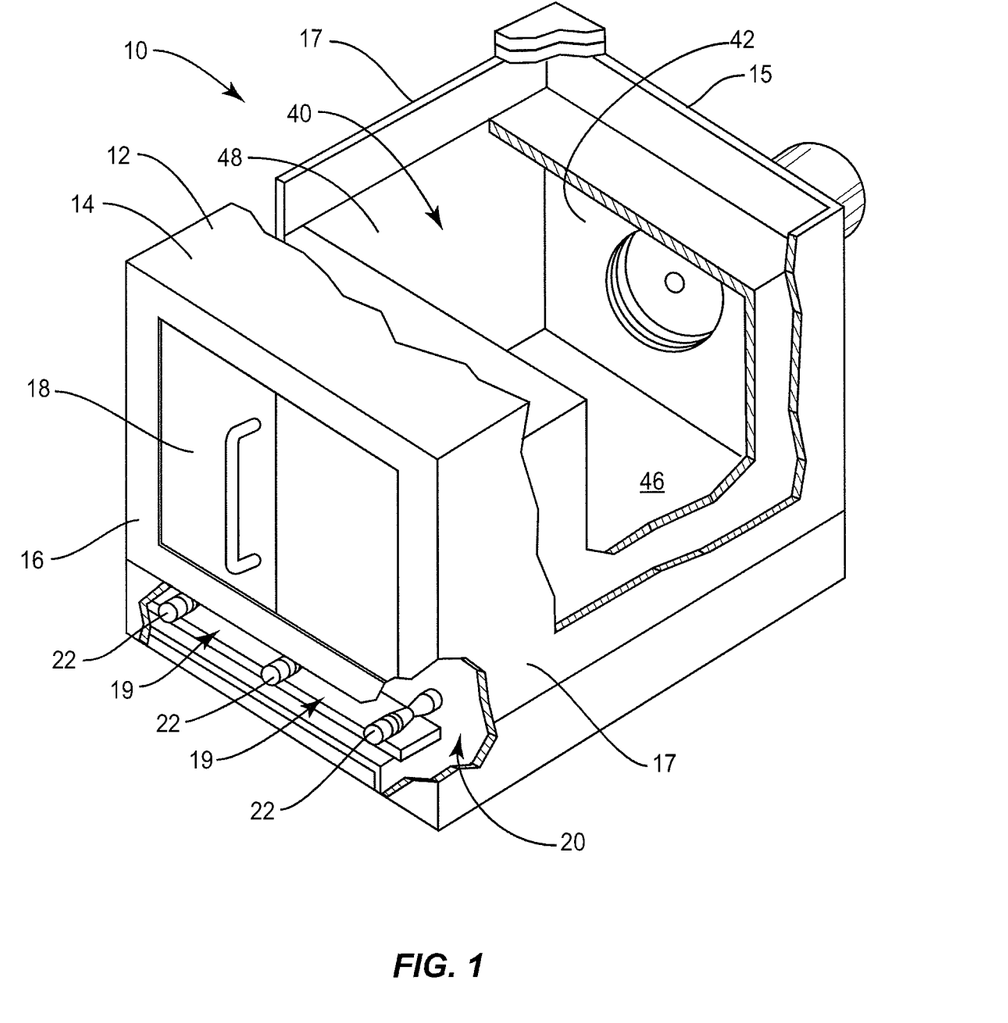
FIG. 1 shows a partial cutaway view of an illustrative combustion convection oven.
Figure 2:
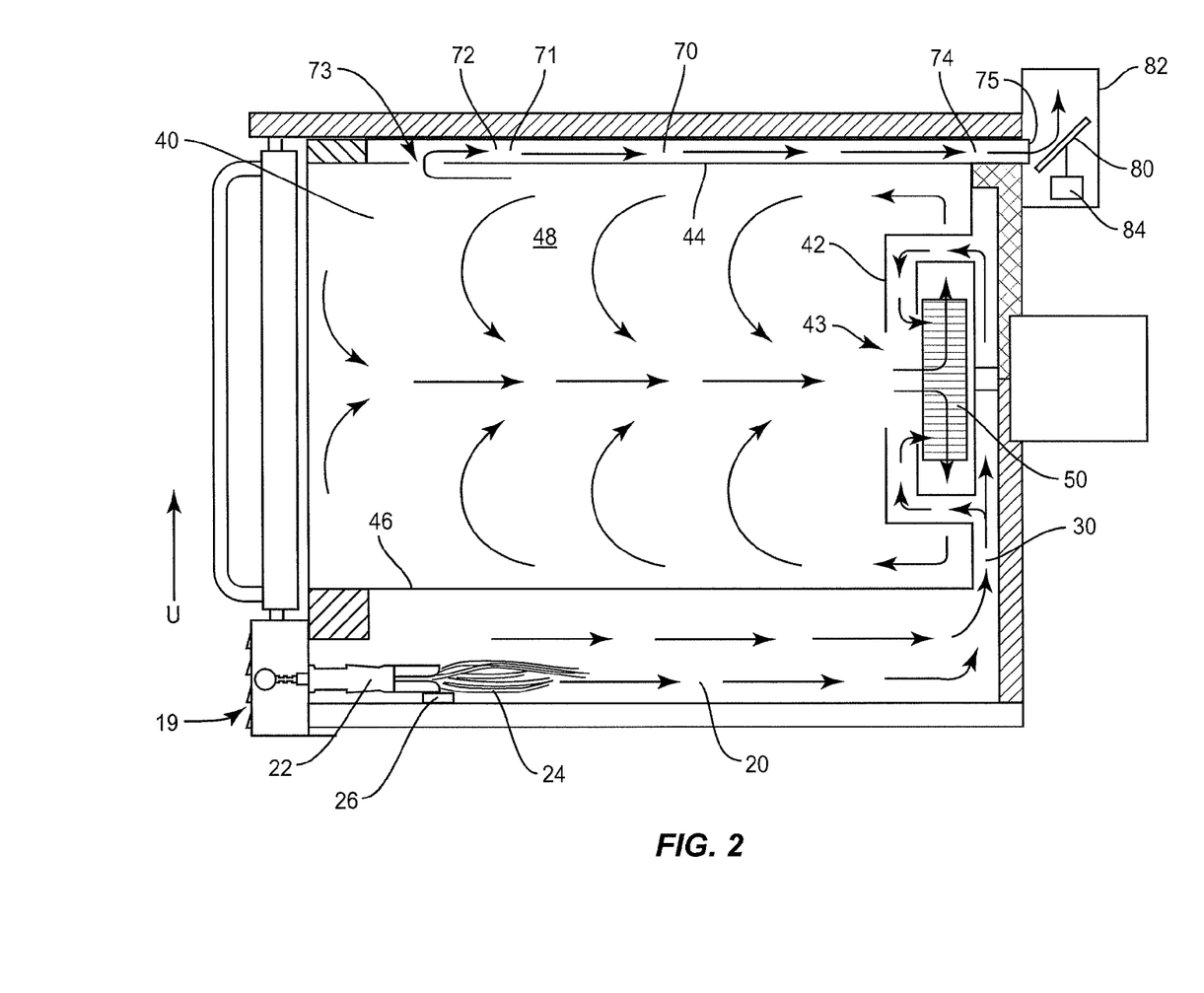
FIG. 2 shows a cross-sectional view of the combustion convection oven of FIG. 1, with oven in the heating mode.

A combustion convection oven according to one embodiment is shown in FIG. 1, and generally designated at 10. The oven 10 includes a housing 12 having a top 14, a back 15, a front 16, and sidewalls 17, as is conventional. A door 18 is attached to the front 16, for accessing the cooking cavity 40. A fresh air inlet or intake 19 is located on the lower portion of the front 16 and/or along a bottom of the housing 12. Referring to FIG. 2, the oven 10 includes a combustion chamber 20, a cooking cavity 40, a fan 50, and an exhaust plenum 70. The combustion chamber 20 is located underneath the cooking cavity 40, so that the air heated therein can more easily rise upward (arrow U) generally toward the cooking cavity 40, via suitable ducting 30 described further below. One or more burners 22 are disposed in the combustion chamber 20, and may advantageously be generally horizontally disposed, so that the flame 24 therefrom (when on) extends generally rearward. Suitable igniters 26 disposed near the burners 22 for igniting the burners 22, and connected to a controller 60 (e.g., microprocessor) for controlling the ignition of the burners 22 (see FIG. 3).

The cooking cavity 40 includes a rear wall 42 disposed forward of the fan 50, a ceiling 44 disposed beneath the exhaust plenum 70, a floor 46 disposed above the combustion chamber 20, and suitable racks (for holding food trays) disposed toward the sides 48. The rear face of the door 18 forms the front wall of the cooking cavity 40 when the door 18 is closed. The rear wall 42 includes an inlet 43 to the fan 50, and advantageously includes a suitable grill-like structure to prevent the food from the cooking cavity 40 from entering the fan 50.

The fan 50 may take any suitable form, such as the centrifugal fan 50 shown in the figures. The fan 50 draws air from the cooking cavity 40 in a center portion of the fan 50 and pushes that air out sideways into suitable ducting that leads back to the cooking cavity 40. Thus, the fan 50 acts to forcibly circulate air in the cooking cavity 40. In addition, the fan 50 helps mix freshly heated air from the combustion chamber 20 with the recirculating air from the cooking cavity 40. To do so, the ducting 30 from the combustion chamber 20 leads to the front of the fan 50, where that freshly heated air is draw into the fan 50 along with the air from the cooking cavity 40.

The exhaust plenum 70 provides a path for air from the cooking cavity 40 to be exhausted outside the oven 10. The exhaust plenum 70 may include a passage 71 and have an upstream portion 72 that includes an inlet 73 along the ceiling 44 of the cooking cavity 40, and a downstream portion 74 that includes an exit port 75, typically located in a rear of the housing 12. The exhaust plenum 70 may run generally horizontally along the ceiling 44 of the cooking cavity 40, but other suitable configurations may be used.

For additional information about the general construction of combustion convection ovens 10, see U.S. Pat. Nos. 5,361, 749; 5,460,157; and 5,655,511.

The oven 10 of FIG. 1 also includes an exhaust damper 80. The exhaust damper 80 may be located proximate the exit port 75 and is moveable between a first position and a second position. In the first or open position, the exhaust damper 80 is open, which allows airflow through the exhaust plenum 70. In the second or closed position, the exhaust damper 80 acts to close off the exhaust plenum 70 so that airflow therethrough is substantially stopped. In the illustrated embodiment, the exhaust damper 80 closes off the exit port 75 so that no or very little air is allowed to flow therethrough. A suitable actuator 84, for example a solenoid or the like, is provided for moving the exhaust damper 80 between the first and second positions. The actuator 84 is in turn controlled by the controller 60. The exhaust damper 80, in the closed position traps the heated air in the cooking cavity 40, so that such air is not unnecessarily exhausted. However, the exhaust damper 80 in the open position allows for airflow through the oven 10, which allows for proper combustion. The operation of the exhaust damper 80 is explained further below. If desired, the exhaust damper 80 may be protected by a suitable shroud 82.

When the controller 60 detects that the cooking cavity 40 is below temperature, the controller 60 causes oven 10 to enter a heating mode. In the heating mode (FIG. 2), the burners 22 are turned on so as to generate flame 24. Fresh air is drawn in the air intake 19, heated in the combustion chamber 20 and routed to the fan 50 to be mixed with the warm (or "tempered") air from the cooking cavity 40 that is being forcibly recirculated. The addition of the hot air causes the pressure in the cooking cavity 40 to increase slightly, which, along with natural convection, causes some air from the cooking cavity 40 to enter the exhaust plenum 70 via the inlet 73. Because the exhaust damper 80 is in the open position, the air exiting from the cooking cavity 40 travels through the exhaust plenum 70 and exits the oven 10 via the exit port 75. Thus, the oven 10 has a heating mode where burners 22 are on, the fan 50 circulates hot air in the cooking cavity 40, and the exhaust damper 80 is in the open position.

Figure 4:
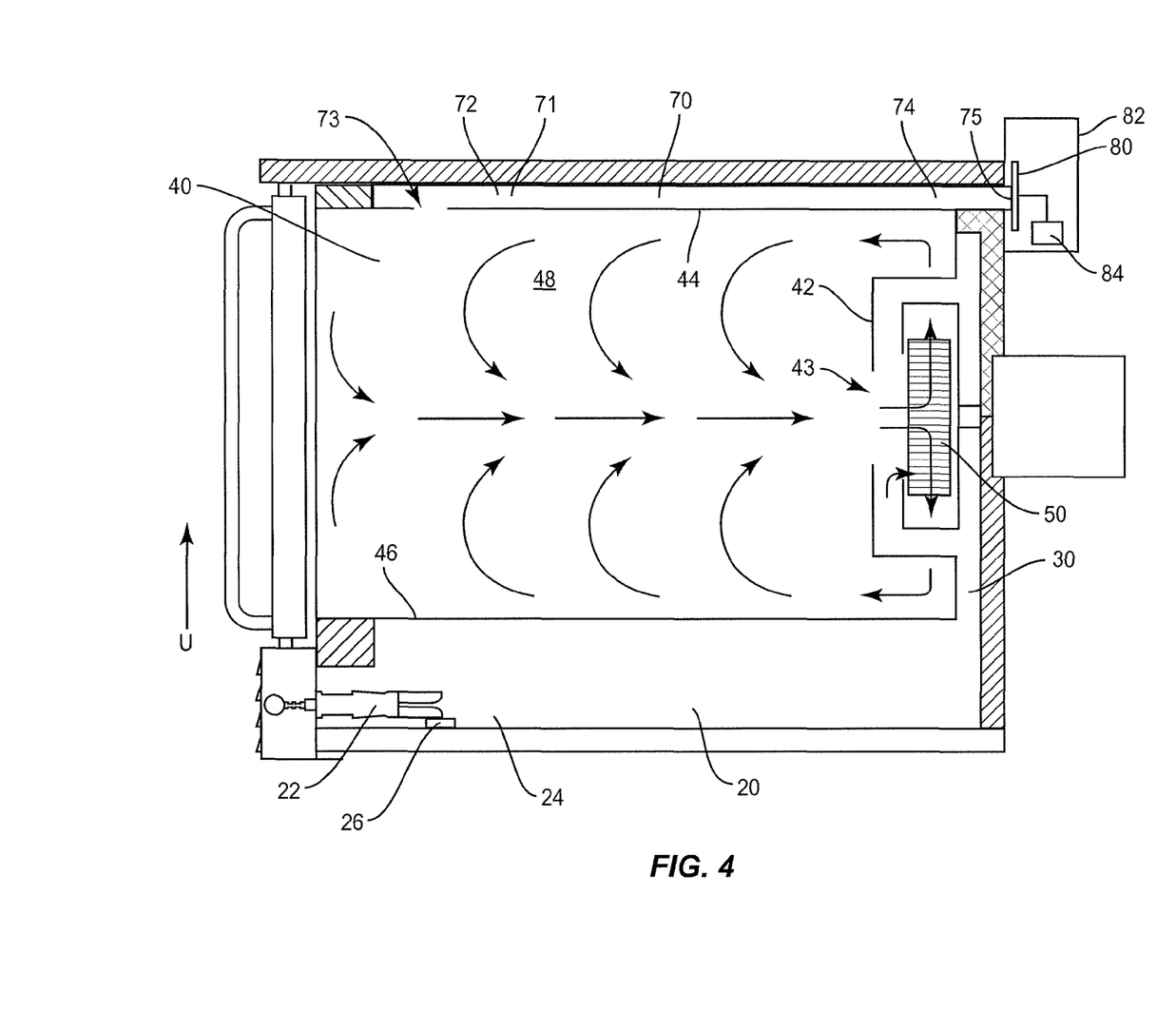
FIG. 4 shows a view similar to FIG. 2, with the combustion convection oven in the heated mode.

Once the controller 60 detects that the temperature in the cooking cavity 40 is sufficiently high, the controller 60 causes the oven 10 to enter a heated mode. In the heated mode (FIG. 4), the burners 22 are off, but the fan 50 continues to forcibly circulate the air in the cooking cavity 40. In addition, the exhaust damper 80 is in the closed position, so that airflow through the exhaust plenum 70 is cut off. Thus, the warm air in the cooking cavity 40 is prevented from escaping, thereby better retaining heat in the cooking cavity 40. Thus, the oven 10 has a heated mode where burners 22 are off, the fan 50 circulates hot air in the cooking cavity 40, and the exhaust damper 80 is in the closed position.

Note that the controller 60 causes the oven 10 to automatically change between the heating and heated modes, with the movement of the exhaust damper 80 being automatically controlled by the controller 60 via the associated actuator 84.

Figure 5:
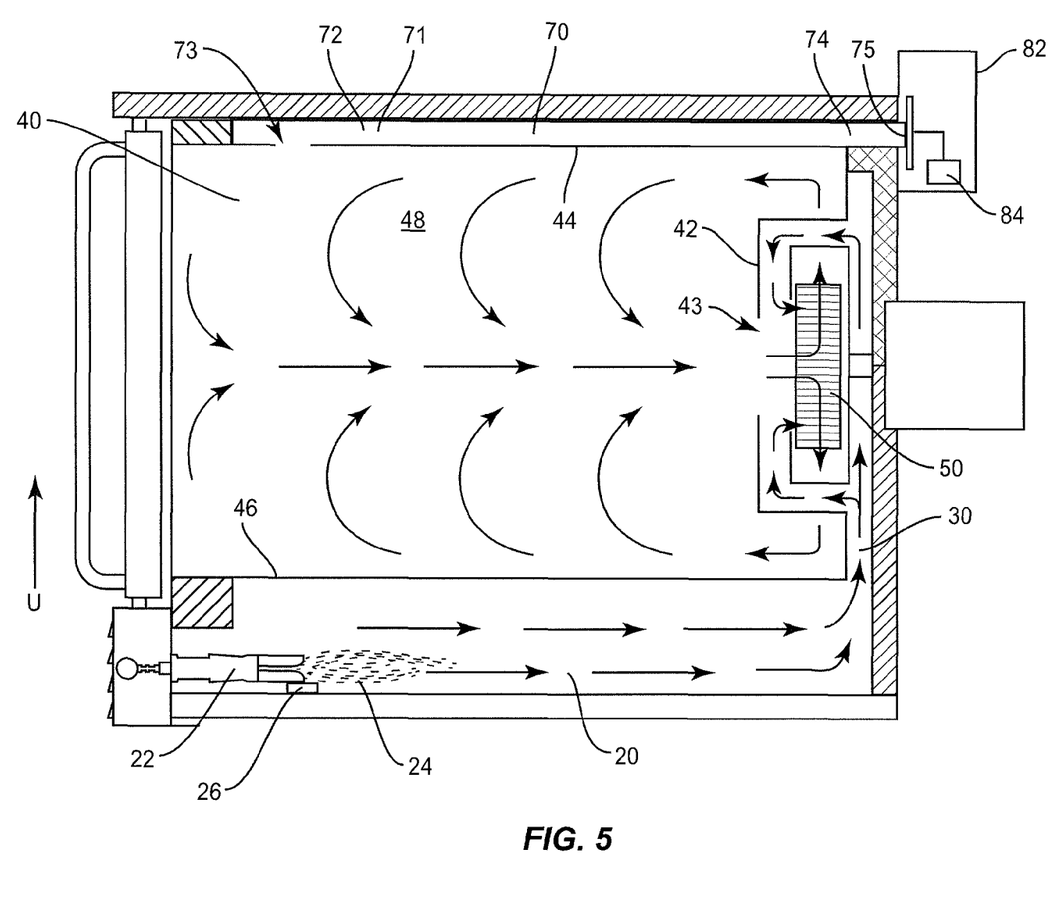
FIG. 5 shows a view similar to FIG. 2, with the combustion convection oven in the ignition mode.

In some embodiments, the oven 10 may also have an ignition mode that is used immediately before the heating mode. In the ignition mode, the burners 22 are being transitioned from being off to being on. More particularly, the heating of one or more igniters 26 is initiated, and thereafter, gas is supplied to the burners 22 so as to generate flame 24. However, in order to minimize airflow across the igniters 26 and/or burners 22 while the burners 22 are being lit, the exhaust damper 80 is kept in the closed position during the ignition mode. See FIG. 5. The ignition mode lasts only a short time so as to allow for the burners 22 to be easily lit, but not so long as to allow the available air to be consumed (which would result in the flames being extinguished or other undesirable outcomes). Thus, the ignition mode lasts for a maximum of fifteen second, and advantageously eight to ten seconds. Note that the ignition mode is advantageously followed immediately by the heating mode, and the oven 10 transitions from the heated mode to the heating mode only via the ignition mode.

The discussion above has been in the context of the exhaust damper 80 being located proximate the exit port 75 so as to abut the exit port 75 when in the closed position. However, the exhaust damper 80 may be located in other locations. For example, the exhaust damper 80 may be located in the downstream portion 74 of the exhaust plenum 70, but upstream of the exit port 75. As another example, the exhaust damper 80 may be located in the upstream portion 72 of the exhaust plenum 70, proximate the inlet 71. In another example, the exhaust damper 80 may be located approximately midway between the inlet 71 and the exit port 75.

Figure 6:
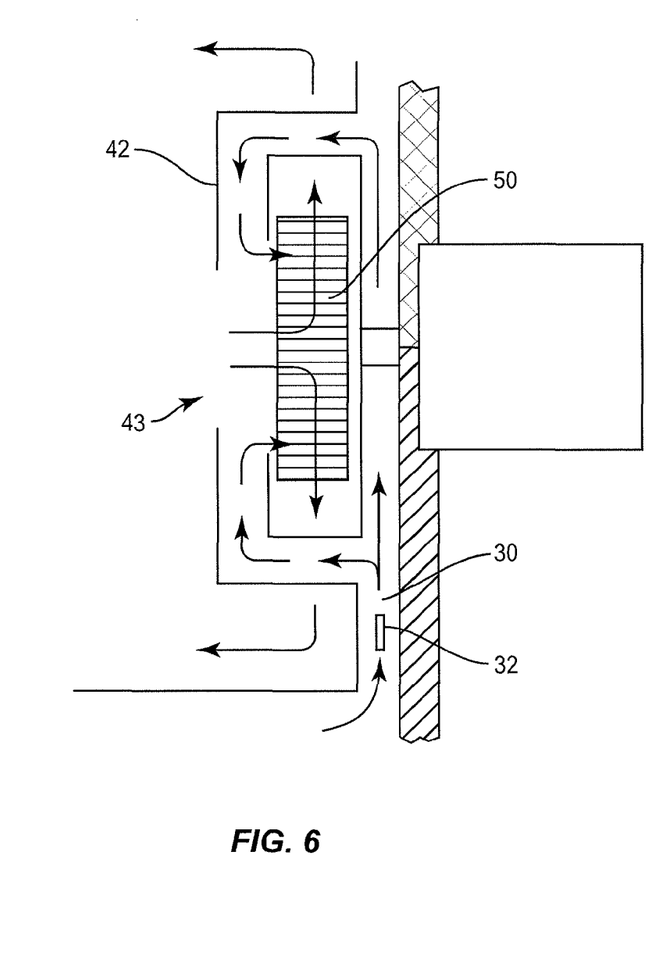
FIG. 6 shows a partial cross-sectional view of a portion of the ducting of the combustion convection oven of FIG. 1, with the internal damper in a more open position.
Figure 7:
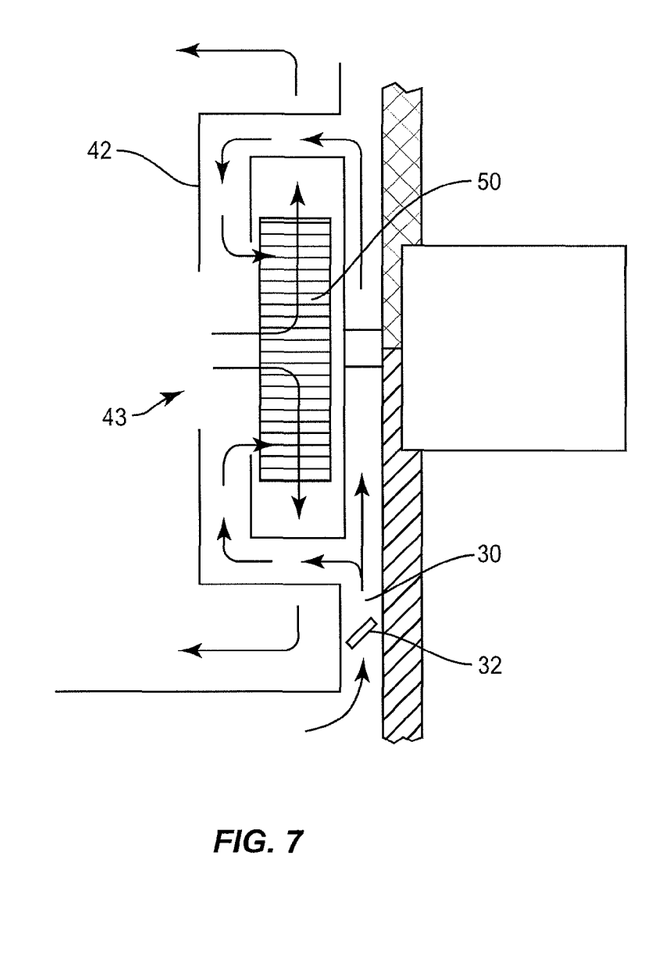
FIG. 7 shows a view similar to FIG. 6, with the internal damper in a less open position.

In some embodiments, the fan 50 may be a multi-speed fan 50, controlled by controller 60. Thus, in the heating mode, the fan 50 may operate at a plurality of speeds, with faster fan 50 speed causing greater circulation in the cooking cavity 40 and believed to cause greater airflow through the combustion chamber 20 and the oven 10 overall. For such embodiments, the ducting 30 between the combustion chamber 20 and the fan 50 may advantageously include one or more variable internal dampers 32 (which are distinct from the exhaust damper 80). The internal dampers 32 are advantageously automatically controlled so that the internal dampers 32 are in a more open position (allowing for easier airflow through the ducting 30) when the fan 50 is operating at a lower speed (FIG. 6), and in a more closed position (providing greater resistance to airflow through the ducting 30) when the fan 50 is operating at a higher speed (FIG. 7). Thus, the "openness" of the internal damper 32 is advantageously inverse to the fan speed, and optionally inversely proportional thereto. The positioning of the internal damper 32 is advantageously controlled by the controller 60 via a suitable actuator 34 (e.g., solenoid) associated with the internal damper 32. As can be appreciated, the internal damper 32 helps automatically throttle the flow of air through the oven inversely with fan speed. Note that airflow through the oven 10 is different from airflow entirely within the oven 10, such as the recirculation airflow between the fan 50 and the cooking cavity 40.

In other embodiments, rather than having an internal damper 32 that is distinct from the exhaust damper 80, the exhaust damper 80 may perform the throttling function described above with respect to the internal damper 32. Thus, the exhaust damper 80 may have multiple "open" positions, with the exhaust damper 80 being automatically positioned in the more closed position when the fan speed is higher, and a more open position when the fan speed is lower.

Figure 3:
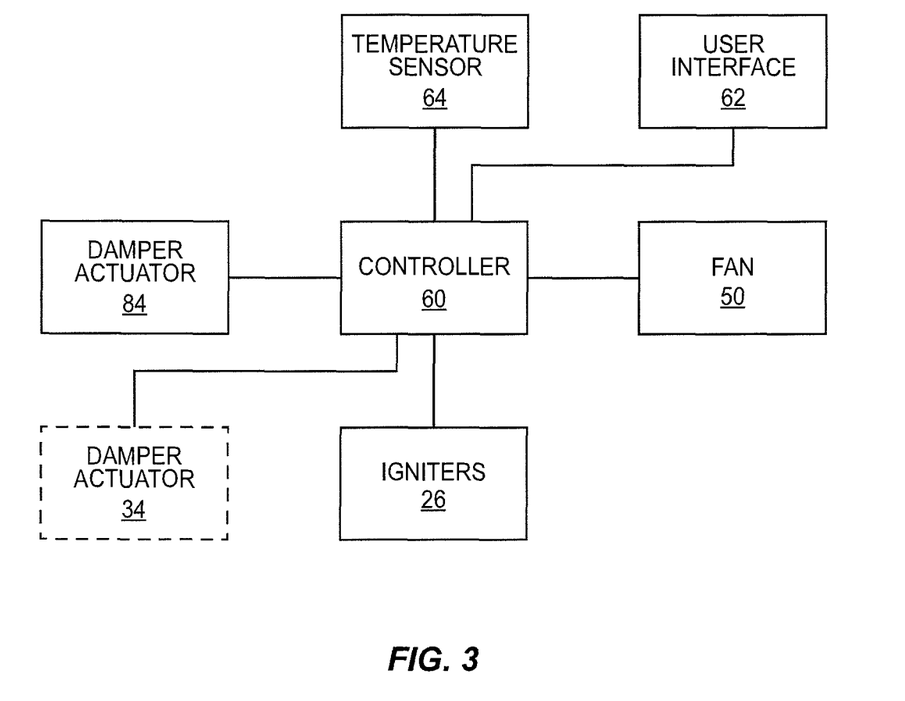
FIG. 3 shows a simplified schematic of the combustion convection oven of FIG. 1.

The overall operation of the oven 10 typically is controlled by controller 60, which may take the form of a microprocessor, analog circuits, or other electric/electronic controls known in the art. As shown in FIG. 3, the controller 60 may be operatively connected to the fan 50, a user interface 62 (for receiving user input and displaying appropriate information), a temperature sensor 64, and various actuators 34, 84 as discussed above. Note that, unlike in the prior art, the controller 60 is programmed to control the actuator 84 for exhaust damper 80 (and optionally actuator 34 for internal damper 32) as described herein.

The disclosure of all patents and patent publications mentioned above are incorporated herein by reference in their entirety.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A method of reducing energy consumption when operating a combustion heated convection oven, the method comprising:
  operating the oven in a heating mode where:
    one or more burners of the oven, disposed in a combustion chamber, are on;
    heated air from the combustion chamber is supplied to a cooking cavity;
    a fan forcibly circulates air in the cooking cavity;

an exhaust plenum is operatively open such that air may flow through the combustion chamber, through the cooking cavity, and through the exhaust plenum to outside the oven;

thereafter automatically operating the oven in a heated mode where:
the one or more burners are off;
the fan forcibly circulates air in the cooking cavity;
the exhaust plenum is substantially operatively closed so that air does not flow out of the cooking cavity, through the exhaust plenum, and then out the oven.

2. The method of claim 1:
further comprising, thereafter automatically operating the oven in an ignition mode prior to reentering the heating mode;
wherein in the ignition mode:
the one or more burners are transitioned from being off to being on;
the fan forcibly circulates air in the cooking cavity;
the exhaust plenum is substantially operatively closed so that air does not flow out of the cooking cavity, through the exhaust plenum, and then out the oven;
wherein the ignition mode is limited to last a predetermined time of not more than fifteen seconds and the oven transitions directly from the ignition mode to the heating mode;
wherein the oven automatically transitions from the heated mode to the heating mode only through the ignition mode.

3. The method of claim 2:
wherein the ignition mode comprises initiating heating of an igniter associated with the burner before supplying gas to the burners;
wherein the ignition mode lasts for not more than about ten seconds.

4. The method of claim 1:
wherein the oven comprises a damper associated with the exhaust plenum and operative to selectively move between a first position and a second position; the first position allowing airflow through the exhaust plenum; the second position substantially preventing airflow through the exhaust plenum;
further comprising automatically moving the damper to the first position when the oven is transitioning into the heating mode;
further comprising automatically moving the damper to the second position when the oven is transitioning into the heated mode.

5. The method of claim 4:
wherein the damper is a first damper;
wherein the oven further comprises a second damper distinct from the first damper and operatively disposed between the combustion chamber and the fan;
wherein the second damper is operative to selectively move between a more open position and a more closed, but still open, position;
further comprising automatically positioning the second damper, when in the heating mode, in the more open or more closed position depending on a speed of the fan such that the second damper is positioned in the more closed position when the speed is greater and in the more open position when the speed is lower.

6. The method of claim 4:
wherein the exhaust plenum comprises an inlet port opening into the cooking cavity;
wherein the exhaust plenum comprises a exit port selectively closable by the damper;
wherein automatically moving the damper to the second position comprises moving the damper to substantially seal the exit port.

7. The method of claim 1 further comprising thereafter returning to the heating mode.

8. The method of claim 1:
wherein the oven comprises a damper associated with the exhaust plenum and operative to selectively move between:
a first position allowing airflow through the exhaust plenum;
a second position allowing airflow through the exhaust plenum;
a third position substantially preventing airflow through the exhaust plenum;
wherein the first position constricts the exhaust plenum more than the second position;
further comprising automatically positioning the exhaust damper, when in the heating mode, in the first or second position depending on a speed of the fan such that the exhaust damper is positioned in the first position when the speed is greater and in the second position when the speed is lower.

9. A combustion convection oven comprising:
a housing having an air intake:
a combustion chamber disposed downstream of the air intake and having a plurality of burners;
a cooking cavity disposed downstream of the combustion chamber;
a fan operable to forcibly circulate air in the cooking cavity;
an exhaust plenum disposed downstream of the cooking cavity and leading from the cooking cavity to outside the housing;
a first variable damper associated with the exhaust plenum and operative to automatically move between an open first position and a closed second position; the first position allowing airflow through the exhaust plenum; the second position substantially preventing airflow through the exhaust plenum;
wherein the oven is operative in a heated mode and a heating mode;
wherein, in the heated mode, the burners are off, the fan circulates air in the cooking cavity, and the first damper is in the second position;
wherein, in the heating mode, the burners are on, the fan circulates air in the cooking cavity, and the first damper is in the first position.

10. The convection oven of claim 9:
wherein the oven is further operative in an ignition mode where the burners are transitioned from being off to being on and the first damper is in the second position;
wherein the oven is operative to transition from the heated mode to the heating mode through the ignition mode.

11. The convection oven of claim 9 wherein the first damper is disposed closer to an downstream portion of the exhaust plenum than an upstream portion of the exhaust plenum.

12. The convection oven of claim 11 wherein the first damper is disposed at an exhaust port of the exhaust plenum.

13. The convection oven of claim 9 further comprising:
a controller disposed in the housing;
an actuator operative to move the first damper between the first and second positions;
wherein the controller is operative to control the operation of the fan, the burners, and the actuator.

14. The convection oven of claim 9 further comprising a variable second damper, distinct from the first damper, and operative to automatically variably restrict airflow through the oven inversely with a speed of the fan.

15. The convection oven of claim 9 wherein the first damper is further operative to automatically variably restrict airflow through the oven inversely with a speed of the fan.

* * * * *